Feb. 8, 1966            E. EISNER            3,234,329
DEVICE FOR THE INSTANTANEOUS SEQUENTIAL
DISPLAY OF INDIVIDUAL CHARACTERS IN
SUPERIMPOSED RELATION
Filed Feb. 20, 1963            2 Sheets-Sheet 1
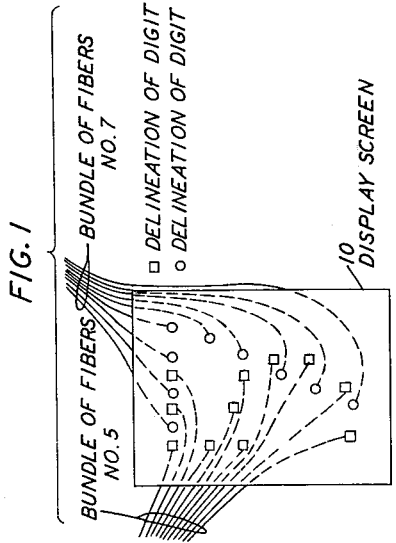
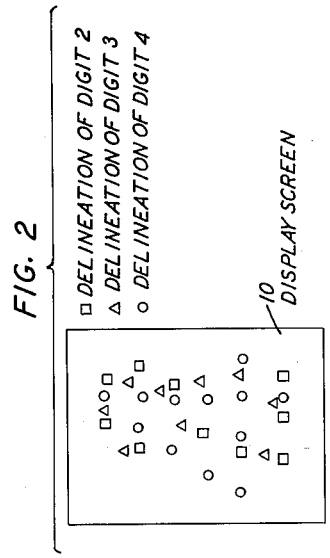
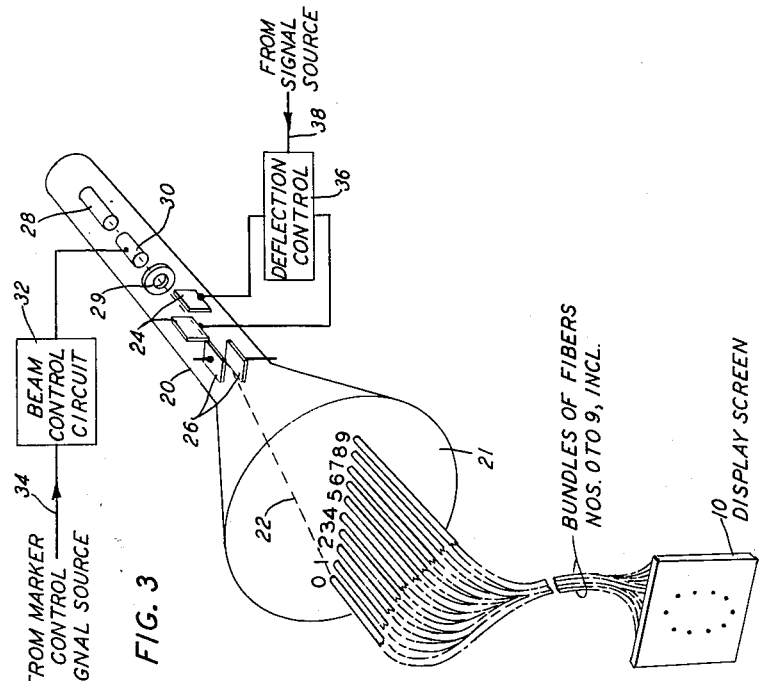
INVENTOR
E. EISNER
BY
H. O. Wright
ATTORNEY

United States Patent Office 3,234,329
Patented Feb. 8, 1966

3,234,329
DEVICE FOR THE INSTANTANEOUS SEQUENTIAL DISPLAY OF INDIVIDUAL CHARACTERS IN SUPERIMPOSED RELATION
Edward Eisner, Bernardsville, N.J., assignor to Bell Telephone Laboratories, Incorporated, New York, N.Y., a corporation of New York
Filed Feb. 20, 1963, Ser. No. 259,936
7 Claims. (Cl. 178—7.85)

This invention relates to display devices. More particularly, it relates to display devices for presenting digits, characters and/or symbols instantaneously and in compact form.

Many display devices such as meters, annunciators and the like are well known and extensively employed by those skilled in the art. The majority of these devices, however, require that the observer scan an appreciable area and many of them respond relatively slowly to changes in the magnitude or character of the parameter to which they relate. More often than not the observer must also read or estimate a quantity from a scale of appreciable dimensions at the instant position of an indicating member or pointer which moves over the scale.

While this is, perhaps, not objectionable where only a limited number of instruments must be read and adequate time for checking the timeliness of the indications and for making the required readings is available, there are situations in which a large number of indicators or a considerable number of digits, characters or symbols must be observed in a relatively limited time interval.

For example, in the navigation of large aircraft the pilot and navigtor are surrounded and the available wall space in the cockpit is filled with instruments each including one or more indicators and/or meters, the indications on which must be frequently checked by either the pilot or the navigator, or both.

As a further example, in the operation of large computing machines the facility of being able to obtain the instantaneous "read out" from time to time of a large number of digits, representing various of the numerous results being obtained, in as compact a form as possible while the computing process is still being carried out would be extremely valuable.

It is, accordingly, a principal object of the invention to reduce the time and effort required in obtaining numerous indications to adequately represent the instant status of a complex operation.

A further object is to simplify the taking of instantaneous readings of numerous parameters involved in the operation of complex systems of apparatus.

A still further object is to reduce the dispersion of display screens where numerous and varied parameters throughout complex systems of apparatus are to be monitored at frequent intervals during operation of the systems.

In accordance with a preferred form of the present invention, an instantaneously responsive device such, for example, as a cathode ray tube, the beam of which can readily be instantaneously turned on or off and simultaneously deflected to a position along a prescribed trace on the target of the tube so as to represent the instant value or condition of a particular parameter, is employed in combination with a single small, independent display screen arrangement. A plurality of bundles of light-conducting fibers are then employed to interconnect a like plurality of positions along the trace on the target of the cathode ray tube with the small display screen.

The present state of the art with respect to "Fiber Optics" is surveyed, for example, in appendix N, pages 553 through 559, inclusive, of the book by John Strong, entitled, "Concepts of Classical Optics," published in 1958 by Freeman and Co., San Francisco, California, and the article entitled, "Fiber Optics Grows Up" by C. J. Lynch in the magazine "Product Engineering," volume 32, No. 40, page 66, for October 30, 1961.

At the target of the cathode ray tube the fibers of each bundle are held closely together with their near ends against the tube target and grouped within an area not greater than the area illuminated by the beam of the cathode ray tube when it is deflected to the point on the trace at which the bundle is held.

For optimum results the ends of the fibers at the target of the cathode ray tube should extend through the exterior surface of the target (which is conventionally of glass) so as to be substantially in actual contact with the phosphor coating on the inside of the said surface, that is, the fibers of each bundle, embedded in a suitable binding material (usually a glass of low refractive index) replace a portion of the surface supporting the phosphor coating. This arrangement not only eliminates the loss of light in passing through the thicker layer of glass normally employed to support the phosphor coating, but also avoids the tendency of the light to disperse or spread in the glass of the target from a discrete illuminated small area of the phosphor. This effect not only increases the "lost" light but also may result in a "spillover" of light into fiber bundles adjacent to the one which should alone be illuminated at the particular instant. British Patent No. 841,200, granted July 13, 1960, to J. S. Courtney-Pratt, may be referred to as illustrative of the embedding of light-conducting glass fibers in a matrix which is used in place of a portion of the glass surface heretofore used to support the phosphor coating of a cathode ray tube.

Furthermore, in typical arrangements of the invention, where an instantaneous reading of a specific parameter is to be obtained by turning on the beam of the cathode ray at a precisely prescribed instant and immediately extinguishing it, the intensity of the beam can for the short moment of operation be made much greater than in cases where the beam is on for much longer intervals. For example, the beam may be turned on momentarily by keying it with very short voltage pulses derived from prescribed portions of a complex computer circuit. Thus such preferred arrangements of the invention are capable of illuminating the ends of the light-conducting fibers to an unusually high intensity. The illumination of the phosphor for even a brief instant will, of course, because of the persistence of its glow, produce an indication of sufficient duration that it can be readily observed.

At the small display screen the ends of the fibers of each bundle are arranged to delineate a letter, symbol, character or digit indicative of a magnitude or condition with respect to the particular parameter corresponding to the deflection of the beam of the cathode ray tube to the point along the trace on the target of the tube at which the particular bundle is connected.

At the display screen the ends of the fibers are preferably positioned flush with the front or viewing surface of the screen to avoid loss of light or dispersion of light which would result were a translucent member such as a sheet of glass placed over the front surface of the display screen. The fiber ends of all the bundles at the display screen are, accordingly, preferably held in a matrix of a glass of low refractive index or of a strongly adhesive material such as an epoxy resin to form the display screen.

The several distinctive delineations of the symbols, characters or digits of all of the fiber bundles are substantially superimposed on the display screen so that the operator needs only to observe a restricted area on the display screen to ascertain the information relating to the instant value of the particular parameter.

Only the delineation of that single symbol, character or digit corresponding to the instantaneous position of the beam along the trace will, of course, appear on the small display screen at any instant since only the fibers of the corresponding bundle will be illuminated. Successive indications on the display screen will, of course, appear in substantially the same position on the display screen so that the observer need not even shift his eyes.

Obviously, a plurality of parameters can be continuously monitored at such instants as may be desired by providing a combination as described immediately above for each parameter. By placing the plurality of small display screens in close juxtaposition, or by employing a plurality of closely adjacent small areas of a single larger display screen for the respective groups of delineations, a plurality of indications conveying information relating to the plurality of parameters, respectively, is provided in a relatively very small or compact total area, the response in each instance being substantially instantaneous.

Thus the operator is relieved of the necessity of observing a like plurality of appreciably dispersed meters, dials and/or indicators such as, for example, those found on the instrument panels of present-day aircraft.

The instantaneous read out of a plurality of digits from a computer is also obviously readily effected by a plurality of the basic combinations of the invention as described above.

In some instances it is apparent that a cathode ray tube having a plurality of beams and independent deflecting means for each beam can advantageously be used in combinations of the invention.

In some applications, it is further obvious that a cathode ray tube need not be employed but that a light ray deflected by a galvanometer mirror or a movable luminescent pointer, or the like, may be employed in its stead to illuminate the appropriate bundle of fibers so that the appropriate digit or symbol appears on the display screen at each instant.

It is also obvious that colored fibers may be employed in particular bundles or colored filters may be employed in the light paths to a selected portion of the fiber bundles so that, for example, indications connoting possible faulty operation can appear in red, acceptable indications in green, and borderline indications in yellow, or the like.

Other and further objects, features and advantages of the invention will become apparent during the course of the following detailed description of illustrative embodiments and from the accompanying drawing in which:

FIGS. 1 and 2 are illustrative of digit delineations which may be employed in connection with display screen arrangements of the invention;

FIG. 3 shows an instantaneously responsive indicating system of the invention in which a single small display screen is employed.

Figure 4:
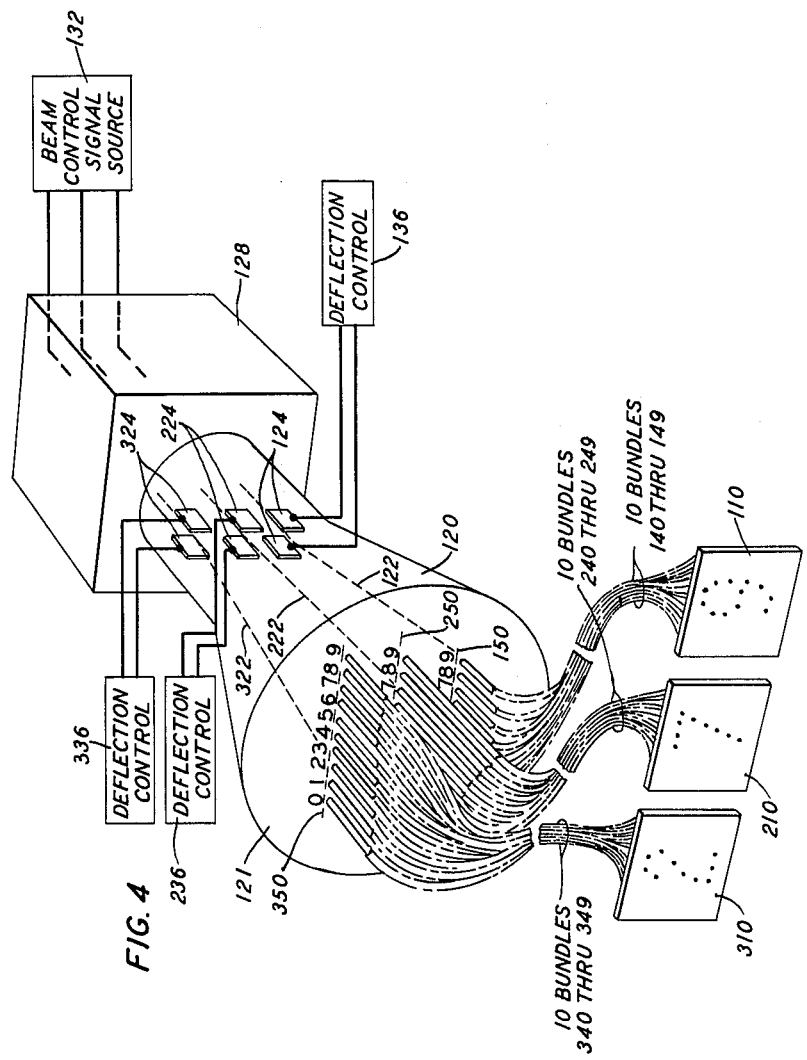
FIG. 4 illustrates the use of a plural beam cathode ray tube and a similarly plural array of display screens in a system of the invention.

In more detail in FIG. 1, a small display screen 10 and portions of two bundles of light-conducting fibers designated by the numbers 5 and 7, respectively, are shown. The eleven fibers shown as comprising bundle number 5 terminate on the front surface of display screen 10 as described in detail hereinabove, one each at the eleven points indicated by the small squares, respectively, so as to delineate the digit 5 on the display screen 10 when light is applied by an appropriate source to the other or far ends of the eleven fibers of the bundle.

A preferred method, for the purposes of the present invention, of selectively illuminating the far ends of the fibers of each respective bundle is shown in FIG. 3 and will be described in detail hereinunder.

Similarly, the nine fibers shown as comprising bundle number 7 terminate on the front surface of display screen 10, one each at the nine points indicated by the small circles, respectively, so as to delineate the digit 7 on the display screen 10 when light is applied to the other or far ends of the nine fibers of bundle number 7.

In FIG. 2, by way of further illustration, the digits 2, 3 and 4 are delineated in the manner described above for FIG. 1 by fiber ends positioned as indicated by the small squares, small triangles and small circles, respectively. Showings of the individual fibers are omitted in FIG. 2 as it is felt that their inclusion would merely result in a confusing illustration. As for FIG. 1, each group of fibers (that is, ten fibers for the digit 2, nine fibers for the digit 3, and twelve fibers for the digit 4) would of course be gathered together as bundles of fibers numbers 2, 3 and 4, respectively.

From FIGS. 1 and 2 it is apparent that a large number of symbols, letters, characters and/or digits may be delineated by appropriate distributions of the ends of associated bundles of fibers on a single small display screen so as to appear in sequence in substantially superimposed positions on the display screen as the other or far ends of the fibers of their respective bundles are illuminated.

While a small number of fibers have been suggested for each delineation as described hereinabove and are deemed sufficient for illustrative purposes, in actual practice a much larger number of fibers would ordinarily be advisable.

Furthermore, for the sake of simplicity in the description of FIGS. 1 and 2, it has been assumed that each spot of each delineation is provided by a single fiber. While fibers of suitably large diameter to produce acceptably pronounced individual spots for each fiber could be used, as a practical matter it would probably be preferable to substitute a plurality of smaller fibers for each such larger single fiber. In such a case the over-all bundles of fibers as described hereinabove would, of course, then each consist of a plurality of subgroups of fibers.

The fiber ends of all the bundles for all the delineations to be provided at the display screen are held flush with the outer or viewing surface of the screen in a matrix of a suitable material such as a glass of low refractive index or an epoxy resin.

In FIG. 3 an illustrative combination of apparatus (utilizing the type of display arrangements illustrated in FIGS. 1 and 2) is indicated, which combination can, for example, afford instantaneous indications of the instant values of a parameter of an operating system.

In FIG. 3 the ten bundles of fibers designated zero (0) through 9, inclusive, have their upper ends aligned at regular intervals along a straight path on the target 21 of a cathode ray tube 20. The lower ends of the fibers of each bundle are arranged on the display screen 10 in the manner exemplified by FIGS. 1 and 2 so that the fibers of each bundle delineate, on the display screen 10, the digit corresponding to the designation number associated with that bundle respectively. The digit zero is shown on the display screen since the beam 22 of the cathode ray tube is shown impinging upon the end of the bundle of fibers designated zero.

The cathode ray tube 20 may be of substantially conventional design, except that each bundle of fibers protrudes through the outer surface of target 21 so that the ends of all fibers are substantially in actual contact with the layer of phosphor on the inner side of the target, as heretofore described. The cathode ray tube should of course include a gun or beam generator 28, a control electrode 30 for instantaneously initiating and/or terminating the existence of the beam, one or more focussing electrodes such as electrode 29, and means for deflecting the beam as, for example, the horizontal deflecting plates 24 and the vertical deflecting plates 26. Appropriate power sources (not shown) should be interconnected between electrodes 28, 29 and 30 in accordance with conventional practice in the art.

In addition, a beam control circuit 32 may also be connected to electrode 30 to suppress the beam except when an appropriate signal, which may be very short pulse or a pulse of any suitable duration, is provided by lead 34 to control circuit 32. As such arrangements are well known and extensively used in the art, there would appear to be no necessity for including a detailed description here. As explained hereinabove, where the beam is on for only very short periods at relatively long time intervals a beam of much greater intensity than for continuous operation can be employed and will obviously produce much brighter indications.

Since in the instance illustrated by FIG. 3 the cathode ray target ends of the fiber bundles zero through 9, inclusive, are regularly spaced along a horizontal straight path on the target 21 of tube 20, only the horizontal deflecting plates 24 need be employed. It is, however, obvious that fiber bundle ends could equally well be distributed along a circular, oval or other shape of path on the target of the cathode ray tube, in which case appropriately varying deflecting voltages should, of course, also be applied to the vertical deflecting plates 26 in accordance with conventional practice.

Accordingly, in FIG. 3 the horizontal deflection plates 24 are connected to a deflection control circuit 36 which provides a voltage proportional to the magnitude of a parameter to be monitored. For example, in a radar system the voltage may vary in proportion to the range or in a computing system the voltage may vary in proportion to the variation in the magnitude of a particular digit. Circuit 36 thus operates in response to a signal over lead 38 from a device such as a metering circuit furnishing a voltage proportional to the instant magnitude of a specific parameter of an operating system to be monitored, to deflect beam 22 when turned on by circuit 32 to the position along its trace at which the appropriate bundle of fibers is positioned, so that a digit representing the instant magnitude of the parameter will be delineated on the display screen.

As explained in detail in connection with FIGS. 1 and 2, the various digits in succession, as their respective bundles of fibers are illuminated by the beam, will appear on the display screen 10 in substantially the same position. An operator therefore need not search for the indication as he must, for example, where the indicator is a meter in which a needle traverses a scale nor need he estimate the position of a needle with respect to calibration marks on a scale.

Furthermore, as is well appreciated by those skilled in the art, the cathode ray beam can be instantaneously deflected so that the indications can represent the instant value of the parameter from moment to moment or at any moments selected by, for example, the transmission of a very short pulse over lead 34 to circuit 32.

Where a plurality of indications of instant values of a like plurality of parameter magnitudes are desired, either a plurality of arrangements such as that just described above and shown in FIG. 3, one for each parameter, may be employed, or a modified arrangement employing, for example, a multiple beam cathode ray tube can be employed. The salient features of the latter type of arrangement are illustrated in FIG. 4.

In FIG. 4 cathode ray tube 120 may be a substantially conventional type of multi-beam cathode ray tube and may, for example, generate three beams 122, 222 and 322, repsectively, which can be deflected horizontally by the pairs of deflecting plates 124, 224 and 324, respectively, along parallel horizontal traces 150, 250 and 350, respectively, the traces being vertically displaced, as shown, on target 121.

Circuits 136, 236 and 336, respectively, control the above described deflections and circuit 132 controls the turning on of the respective beams when indications are required.

Ten fiber bundles 140 through 149, inclusive, are regularly spaced along trace 150. Likewise, ten fiber bundles 240 through 249, inclusive, are regularly spaced along trace 250. Finally, ten fiber bundles 340 through 349 are regularly spaced along trace 350.

As described hereinabove for the arrangement of FIG. 3, the fibers of the three groups of fiber bundles preferably extend through the surface of target 121 so that all fiber ends are substantially in contact with the phosphor layer on the inside of target 121.

The three groups of fiber bundles, just mentioned, extend to the outer surfaces of display screens 110, 210 and 310, respectively, as described hereinabove in connection with display screen 10 of FIG. 3. They provide, for example, by the delineation method described in detail in connection with FIGS. 1 and 2, for the display of an appropriate digit between zero and 9, inclusive, on their respective display screens 110, 210 and 310, the digit instantly displayed in each instance being of course determined by the instant position of the associated cathode ray beam 122, 222 or 322, respectively, when turned on by a pulse from circuit 132. Display screens 110, 210 and 310 may obviously be individual units, as shown, or, alternatively, they may be adjacent portions of a single larger screen.

While the delineation of the digits zero through 9 has been suggested in the illustrative arrangements of FIGS. 3 and 4, it is, of course, apparent that letters of the alphabet, symbols and/or characters of any type can equally well be delineated in the same manner as illustrated for the digits.

Numerous and varied modifications and rearrangements of the above described illustrative embodiments within the spirit and scope of the principles of the invention can readily be devised by those skilled in the art. No attempt to disclose all possible arrangements within the scope of the invention has been made.

What is claimed is:

1. In an indicating system, a display screen, a plurality of bundles of light-conducting fibers and a surface upon which a significantly movable luminescent indication is produced along a prescribed path, the bundles of light-conducting fibers interconnecting the display screen and the said surface, the fibers of each bundle delineating on the display screen a digit, character or symbol differing from those delineated by the other fiber bundles, the delineations of the plurality of digits, characters or symbols being substantially superimposed upon each other on the display screen, various of said fiber bundles being of distinctively differing colors, the opposite ends of the fiber bundles terminating on the said surface at regularly spaced points along the prescribed path on the said surface.

2. The arrangement of claim 1 in which the ends of the fibers at the display screen are flush with the front surface of the screen.

3. The arrangement of claim 1 and means for momentarily turning on the luminescent indication.

4. An instantaneously responsive indicating device comprising a single display screen, a cathode ray tube having a beam generating means, beam deflection means, beam intensity control means, and a target responsive to the beam to produce light when the beam impinges upon it, and a plurality of bundles of light-conducting fibers, one end of each fiber bundle terminating on the display screen, the fiber ends of each bundle on the display screen being positioned to delineate a prescribed digit, character or symbol differing from those of the other bundles, the delineated digits, characters or symbols of all fiber bundles occupying substantially superimposed positions on the display screen, various of said fiber bundles being of distinctively differing colors, the other ends of the fiber bundles terminating on the target of the cathode ray tube and being spaced from each other along a prescribed path on the target.

5. The arrangement of claim 4 in which the ends of the fibers at the target of the cathode ray tube are substantially in direct contact with the portion of the target producing light in response to impingement of the beam upon it.

6. The arrangement of claim 4 and means for momentarily turning on the beam of the cathode ray tube.

7. The arrangement of claim 4 in which the ends of the fibers at the display screen are flush with the outer or viewing surface of the display screen.

References Cited by the Examiner

UNITED STATES PATENTS

| | | | |
|---|---|---|---|
| 2,765,458 | 10/1956 | Hoover | 340—380 |
| 3,043,179 | 7/1962 | Dunn | 178—7.85 |
| 3,109,065 | 10/1963 | McNaney | 250—227 |
| 3,125,683 | 3/1964 | Stewart et al. | 250—227 |
| 3,130,263 | 4/1964 | Manning | 178—7.85 |

DAVID G. REDINBAUGH, *Primary Examiner.*